United States Patent [19]

Vasella

[11] Patent Number: 4,628,970

[45] Date of Patent: Dec. 16, 1986

[54] APPARATUS FOR REFILLING COMPRESSED-GAS BOTTLES

[75] Inventor: Marco Vasella, Zürich, Switzerland

[73] Assignee: Kothenberger GmbH & Co. Werkzeuge-Maschinen KG, Frankfurt, Fed. Rep. of Germany

[21] Appl. No.: 670,164

[22] Filed: Nov. 9, 1984

[30] Foreign Application Priority Data

Nov. 22, 1983 [DE] Fed. Rep. of Germany ....... 3342014
Oct. 15, 1984 [DE] Fed. Rep. of Germany ... 8430245[U]

[51] Int. Cl.[4] ................................................ B01J 7/00

[52] U.S. Cl. ...................................... 141/18; 422/167; 422/120; 422/126

[58] Field of Search ................... 141/2, 18, 21, 82, 98, 141/4, 5, 37; 422/164–167, 120, 122, 126

[56] References Cited

U.S. PATENT DOCUMENTS

| | | | |
|---|---|---|---|
| 2,558,756 | 7/1951 | Jackson et al. | 422/120 |
| 2,775,511 | 12/1956 | Geffroy et al. | 422/167 |
| 2,890,319 | 6/1959 | Watrous, Jr. | 422/167 |
| 3,117,424 | 1/1964 | Hebenstreit | 422/167 |
| 3,443,907 | 5/1969 | Mausteller | 422/120 |
| 3,573,001 | 3/1971 | Bovard | 422/120 |
| 3,737,287 | 6/1973 | Churchill et al. | 422/120 |
| 3,756,785 | 9/1973 | Netteland | 422/120 |
| 3,912,458 | 10/1975 | Fukuma et al. | 422/167 X |
| 3,986,838 | 10/1976 | Reichert . | |
| 4,111,661 | 9/1978 | Rothenberger | 422/117 |
| 4,230,667 | 10/1980 | Williams | 422/120 X |
| 4,342,725 | 8/1982 | Collins | 422/126 |
| 4,427,635 | 1/1984 | Hahn | 422/126 X |

FOREIGN PATENT DOCUMENTS

| | | | |
|---|---|---|---|
| 2243888 | 4/1973 | Fed. Rep. of Germany | 422/167 |

*Primary Examiner*—Stephen Marcus
*Assistant Examiner*—Ernest G. Cusick
*Attorney, Agent, or Firm*—Felfe & Lynch

[57] ABSTRACT

Apparatus for refilling compressed-gas bottles, having a threaded connector and valve, especially for small gas bottles. A cartridge holder serves to hold jacket-less, oxygen-yielding cartridges whose oxygen can be transferred from the interior of the cartridge holder to the compressed-gas bottle. To solve the problem of achieving the inexpensive refilling of compressed-gas bottles with little oxygen loss, without endangering the operator by the development of undue heat, the cartridge holder of the invention preferably is made in the form of a substantially closed pressure body surrounding the cartridge as closely as possible. Also, a threaded connection is provided for the installation of the pressure body on the compressed-gas bottle. A gas passage serves for the transfer of the oxygen to the compressed-gas bottle connector. Furthermore the pressure body comprises cooling ribs and a heat guard with ventilation openings communicating with grooves between the cooling ribs.

7 Claims, 7 Drawing Figures

Figure 1:
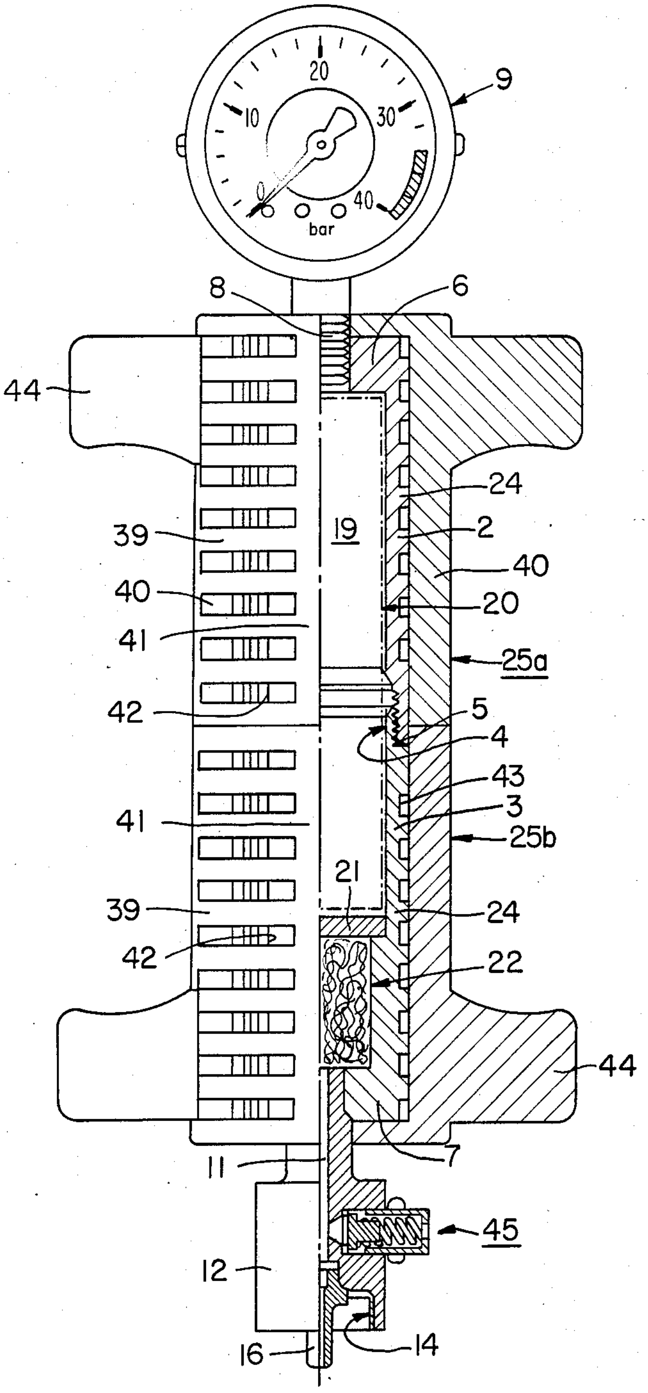

F .2
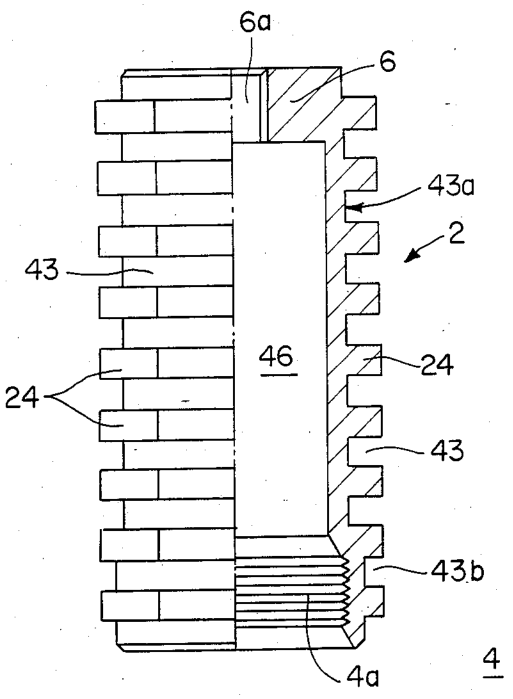
FIG. 3
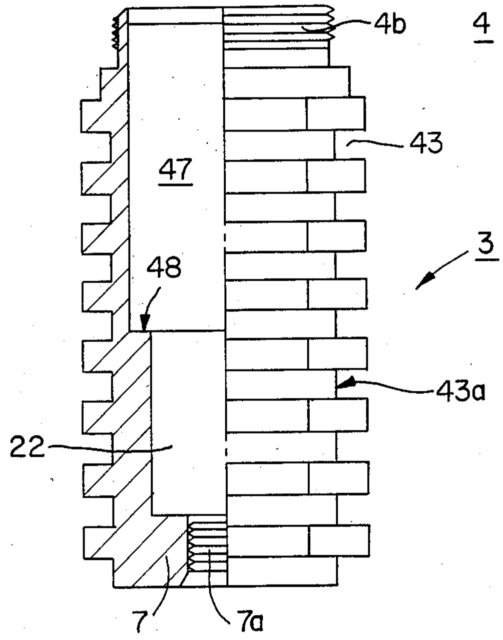

FIG. 4
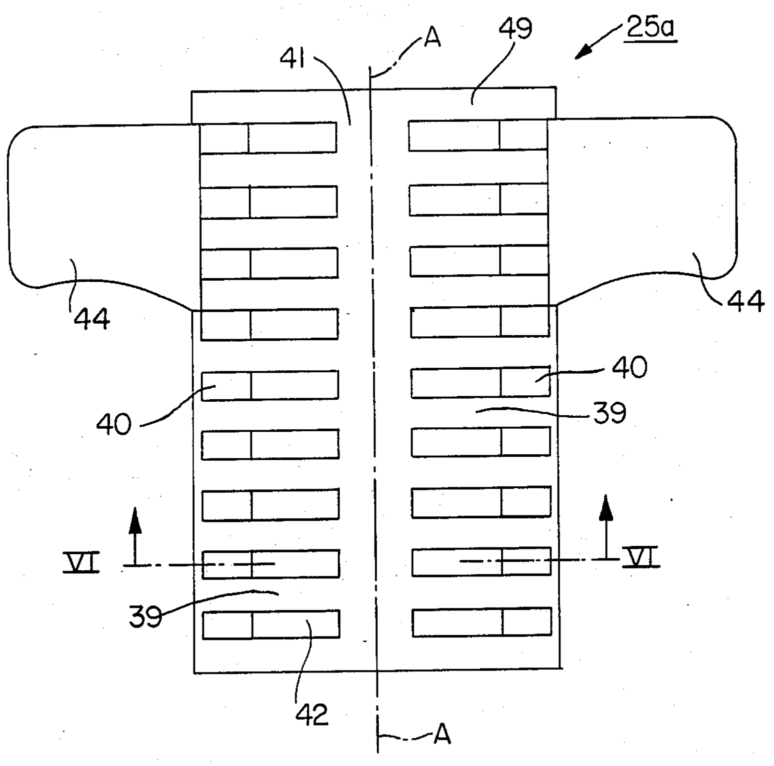
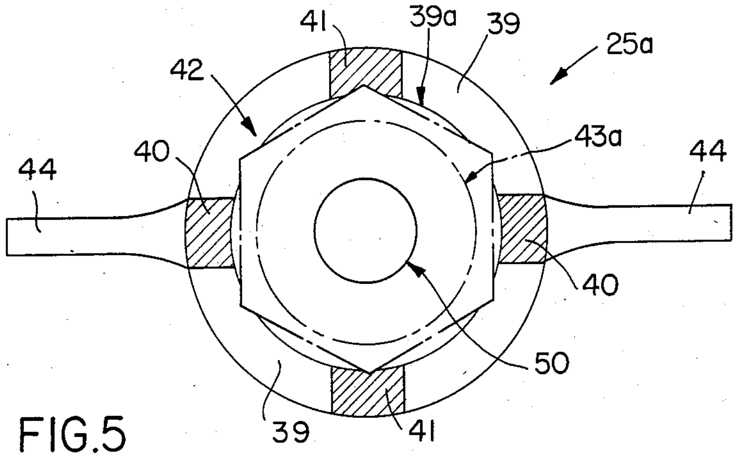
FIG. 5

APPARATUS FOR REFILLING COMPRESSED-GAS BOTTLES

BACKGROUND OF THE INVENTION

The invention relates to an apparatus for refilling compressed-gas bottles, having a threaded connection and valve, especially for small gas bottles of a capacity of less than 1000 ml, and a rated fill pressure up to about 34 bar, by means of a combustible unjacketed cartridge yielding oxygen in the burning state, and having a cartridge holder accommodating the cartridge, from whose inner chamber the oxygen can be transferred to the compressed-gas bottle.

Gas producers using a mixture of chemical compounds from which oxygen is released by an exothermic reaction have long been known. As a rule, the mixture is one of an alkali metal chlorate or perchlorate and an oxidizable substance which, while burning after an igniting process, provides just enough heat for the reaction to progress at an approximately uniform rate of migration in the cartridge, while excess oxygen is continuously released. The reaction mixture is formed into a solid, pressed body, namely the cartridge mentioned above. The temperature in the reaction zone is about 650° C.

From U.S. Pat. No. 3,573,001 it is known to provide such reaction mixtures in the form of a solid body with an electrical igniter, and with an insulating envelope of a filter material, and to insert it into a take-apart container which is provided with an opening for the continuous delivery of oxygen. However, the known apparatus is not suitable for refilling compressed-gas bottles, since the pressure in the gas generator must always be higher than it is on the receiver side. On account of its closure alone, the known container would be incapable of withstanding such a pressure build-up. Furthermore, the pressure build-up within the porous thermal insulation would cause the loss of a considerable portion of the oxygen.

The same U.S. Pat. No. 3,573,001 also discloses a pressure container having a storage chamber and an internal cartridge holder in which a plurality of cartridges is disposed, each with its own electrical igniting mechanism. The individual cartridges are progressively ignited by a pressure measuring device as the pressure drops. To prevent the combustion from running out of control through all of the cartridges, each individual cartridge must be surrounded by an individual jacket of thermal insulating material. This known apparatus is also unsuitable for use as an apparatus for refilling compressed-gas bottles, because in the event of a pressure equilibrium, which is ultimately possible, a considerable amount of the oxygen would be left in the storage chamber. Furthermore, since the built-in igniting mechanism has to operate step-wise, this apparatus is exceedingly complex.

U.S. Pat. No. 3,737,287 discloses an oxygen producer having a take-apart container into which jacketed cartridges with a built-in percussion igniter can be inserted. This known apparatus also has a storage chamber, and additionally a cavity of considerable size exists within the cartridge jacket. The apparatus is, again, not designed or suitable for operation for the refilling of compressed-gas bottles, because at the pressure equilibrium that is to be achieved in the most favorable case, considerable amounts of oxygen would remain in the container, to escape when the container is reopened for the purpose of recharging with a fresh cartridge. Although the container is called a pressure container, the pressure involved is only relatively low, since the illustrated container closure is not capable of withstanding very high pressures. As a precautionary measure, therefore, the container is equipped with a pressure relief valve. The cartridges, which are provided with a percussion igniter as well as a metal jacket, are relatively expensive, so that the operation of the apparatus is correspondingly expensive. German publication OS No. 2,461,681 discloses a refilling apparatus of the kind described in the beginning, which is designed, it is true, for larger compressed-gas bottles. Here, again, the cartridge holder is disposed in the interior of the container, which is definitely a compressed-gas bottle, and is in the form of a tube open at one end, whose interior is in permanent communication with the compressed-gas bottle. The cartridge holder which is open at one end and surmounted by a pressure gauge is therefore, in the present case, the actual refilling apparatus. This cartridge holder is charged with jacket-less cartridges, while it is not of any great importance how big the space surrounding the cartridges is, since it is precisely this chamber that receives the entire amount of oxygen released. The known apparatus, however, is correspondingly bulky, and as a whole is not suitable for refilling smaller compressed-gas bottles.

With regard to a refilling operation, furthermore, the following is to be noted: Since the oxygen can always flow only in the direction of diminishing pressure, the gas exchange between the gas producer and the compressed-gas bottle comes to a stop no later than when pressure equilibrium is reached, unless the pressure in the refilling apparatus has to be higher on account of the presence of a non-return valve. As a consequence, the oxygen losses are proportional to the ratio between the volume in the refilling apparatus and the volume in the bottle that is to be filled. Even if the capacities in the refilling apparatus on the one hand and in the bottle being filled on the other were to be equal, half of the oxygen would remain at half pressure in the refilling apparatus, and would be lost when the latter is disconnected, or when it is reloaded with a gas-yielding cartridge. Also the compressed-gas bottle being refilled will contain only half of the maximum amount of oxygen achievable, on account of the halving of the pressure. If the free volume or storage volume of the gas producer were still greater, the situation would be worse.

The invention is addressed to the problem of providing a refilling apparatus of the kind described in the beginning, whereby compressed-gas bottles, especially standardized small gas bottles, can be refilled with high-purity oxygen to a very high pressure, inexpensively and with a minimum loss of oxygen.

SUMMARY OF THE INVENTION

The solution of the stated problem is achieved in accordance with the invention, in the refilling apparatus described in the beginning, in that the cartridge holder preferably is in the form of a substantially fully closed pressure body surrounding the cartridge as closely as possible and having an internally threaded fitting to enable the pressure body to be threaded onto the compressed-gas bottle, plus a compressed-gas passage running through the internally threaded fitting to transfer the oxygen to the compressed-gas bottle.

Due to applicant's teaching that the cartridge holder preferably be made in the form of a substantially fully closed pressure body, which is in contrast, for example, to U.S. Pat. No. 3,573,001 and German publication OS No. 2,461,681, the oxygen is unable to escape uncontrolledly into the surroundings of the cartridge holder. The release of the oxygen is therefore basically limited first to the capacity of the pressure body.

Due to the further constructive teaching that the pressure container is to envelop the cartridge as closely as possible, "as closely as possible" being understood as a gap of a few mm, or if possible even less than 1 mm, the proportion of oxygen remaining in the pressure body after pressure equilibrium is reached is extremely small, and is even effectively reduced by the burnt stub of the cartridge remaining in the pressure body. Moreover, when a fresh cartridge is loaded, little air flows into the pressure container, and even that is almost entirely displaced when the fresh cartridge is inserted, so that even the initially released oxygen is hardly contaminated or "diluted" with nitrogen.

It is to be mentioned, for example, that one of the mostly commonly available oxygen-yielding cartridges has a diameter of 2.7 cm and a length of 11.7 cm. The volume thus amounts to 67 cubic centimeters. Even if a total volume of about 100 cu.cm is provided within the pressure body for the accommodation of other means such as filter materials, for example, the amount of gas remaining in this case is even less than 10% of all of the amount of gas released, assuming a small gas bottle of a capacity of barely 1000 cu.cm. The pressure loss likewise amounts to only about 10%, since the volume of the compressed-gas bottle is increased by no more than 20% of the amount of oxygen released. It is to be noted that small gas bottles available commercially are supplied with a charge pressure of about 34 bar. The above-described cartridge contains on the average about 30 liters of oxygen at standard pressure, so that such small gas bottles can be refilled to a pressure of up to 34 bar. The nitrogen content amounts to less than 3%.

With the refilling apparatus of the invention, it is possible for the user of a compressed-gas bottle to refill the latter by himself, quickly and inexpensively, even on Sundays and holidays, i.e., the typical "home handyman days". The cartridges can be stored safely in large quantities with the exclusion of moisture. A commercially obtainable case, which can be ordered by mail, contains cartridges for 10 refills, and has a very light weight.

The cost of the recharge amounts to about 20% of the cost of a fresh, full bottle of compressed gas. This is because the oxygen companies require a high fee to cover them for the cost of circulation of the bottles. While refilling itself is cheap, transportation and management are very cost-intensive.

The refilling of available compressed-gas bottles is furthermore environmentally desirable, since no longer will most empty bottles be thrown into the garbage. The spent cartridges themselves consists of harmless salts, especially sodium chloride, and of oxides of the combustible components. Therefore the spent cartridges constitute no threat to the environment.

The compressed-gas bottles refilled with the apparatus of the invention serve in conjunction with fuel-gas bottles for welding and brazing with small and mini-burners down to microburners. In addition to "home handyman" operations of all kinds, the apparatus of the invention is suitable for all kinds of crafts, jewelry-making, modeling and refrigeration repair work, and for dental laboratory operations.

The fuel gases for this purpose are propane and butane, mixtures of these gases, as well as comparable gases which are offered world-wide by numerous firms. Also usable are fuel gases containing acetylene.

It is especially advantageous, in accordance with the further invention, if the pressure body is in the form of a tubular burner case having on one end the internally threaded fitting for the connecting thread of the compressed-gas bottle. The pressure body can also be equipped with a pressure gauge.

In the simplest case, a refilling apparatus of this kind is in the form of a hand piece which, when charged with the burning cartridge, can be screwed quickly and reliably onto the compressed gas bottle. Since the connection to the compressed-gas bottle is simultaneously produced, the pressure gauge automatically indicates not only the pressure in the pressure body, but also the virtually identical pressure in the compressed-gas bottle. At this time it would therefore be known immediately whether, for example, the refilling apparatus might have been screwed onto a compressed-gas bottle that is still partially full, so that the pressure at burn-out would assume correspondingly higher levels. Conventional compressed-gas bottles, however, are designed for such excess pressures.

It is furthermore advantageous to provide cooling fins on at least part of the length of the pressure body. This considerably lowers the maximum temperature at the end of the burn and considerably reduces the time that must elapse before the refilling apparatus can be used again.

To prevent fires, but at least for the prevention of painful contact with the pressure body, it is also especially advantageous to provide it with a heat guard along at least a portion of its length. It is quite especially desirable for the heat guard to be made of a thermal insulating material, which of course reduces the dissipation of heat to the surroundings, but at the same time permits safe handling at the end of the burn. The heat guard can nevertheless assist in the dissipation of heat if it is provided with an appropriate surface structure. This structure can consist preferably of longitudinal ribs, thus providing a better grip on the apparatus.

In accordance with the further invention, it is especially advantageous to provide the outside surfaces of the parts forming the pressure body with a polygonal cross section in the area of the cooling fins, preferably a hexagonal cross section, and for the grooves between the cooling fins to have a circular cross section at the bottom.

The pressure body can be made of prismatic bar stock by providing each of two bar sections of approximately equal length with an axial blind hole having an inside diameter of about 30 to 32 mm, i.e., one which closely surrounds the jacket-less cartridge with smooth, metal walls. Thus, between the cartridge and the pressure body there will be no porous insulating or filter material to uselessly add to the internal volume.

The prismatic exterior surface serves especially to prevent any rotation of the heat guard as will be further explained below.

This heat guard consists, in accordance with the further invention, of a hollow body provided with ventilation openings, which is pushed onto the cooling ribs of the pressure body such that the ventilation openings communicate with the grooves between the cooling fins, and especially align with them radially.

In an especially simple manner, the heat guard here consists of a plurality of rings which are disposed coaxially one behind the other and are joined together on the circumference by axis-parallel bridging. The bridges disposed at equal intervals of 90 degrees of angle and the said rings then enclose the ventilation openings between them. Basically, the result is a structure of basket-like open-work of a heat-resistant insulating material through which the heat-exchanging surfaces of the pressure body communicate with the atmosphere through the ventilation openings with as little interference as possible, so as to promote thermal exchange by radiation and convection.

The outer envelope surface of all rings is preferably a cylindrical surface, while the inner envelope surface of the rings and, if desired, of the axis-parallel bridging is complementary to the cooling fins of the pressure body, at least at the corners, so that the heat guard can be pushed onto the corresponding part of the pressure body.

It is especially advantageous for the bottom of the grooves between the cooling fins to be at a distance from the bridges. This will make it possible for the cooling air to flow freely behind the bridging around the pressure body so that temperature build-up is reduced to a minimum.

It is especially advantageous for the two parts of the pressure body to have each approximately half the length of the pressure body, and for the two heat guard bodies to be of identical configuration and abut against one another at their open ends, approximately at the center of the pressure body.

In this manner only one injection-molding or pressing die is needed for the production of the heat guard, and the inventory for production and spare parts orders is reduced.

Lastly, it is especially advantageous for the heat guard to be provided with radially projecting ears in the manner of wing nuts. Since the heat guard is form-fitted to the pressure body, the two parts of the pressure body can thus be screwed tightly together and then taken apart again at the end of the burn in case the threaded coupling between the two pressure body parts should have been made rather tight by the heat.

The invention, however, is not limited to its application to small gas bottles. One advantageous application consists in its installation on a compressed-gas bottle which can also have a greater capacity (5 liters and over), such a compressed-gas bottle having, in addition to its thread for connecting the refiller, a connection for an appliance feeding line as well as a non-return valve which opens in the direction of the compressed-gas bottle. In this manner virtually continuous operation can be achieved with the continuous delivery of large amounts of oxygen. The refiller in this case serves as a lock for the admission of the originally solid (bound) and then gaseous oxygen.

In accordance with the invention, refilling apparatus for a compressed-gas bottle with threaded connector and valve, by means of a combustible jacket-less cartridge yielding oxygen in the burning state, comprises a cartridge holder accommodating the cartridge, from whose interior the oxygen can be transferred to the compressed-gas bottle. The cartridge holder comprises pressure body means substantially closed on all sides and surrounding the cartridge closely. The cartridge holder has a counter-thread portion for the external screwing of the pressure body means onto the compressed-gas bottle connector and a compressed-gas passage carried through the counter-thread portion for the transfer of the oxygen to the compressed-gas bottle.

For a better understanding of the present invention, together with other and further objects thereof, reference is made to the following description, taken in connection with the accompanying drawings, and its scope will be pointed out in the appended claims.

PREFERRED EMBODIMENTS OF THE INVENTION

Figure 6:
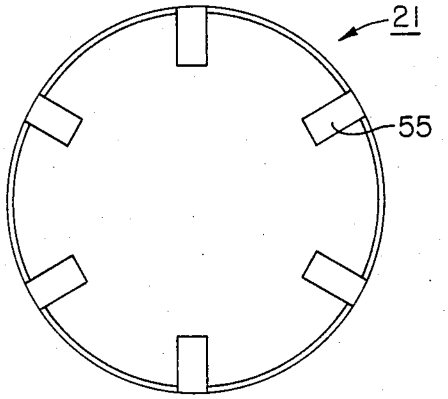
Figure 7:
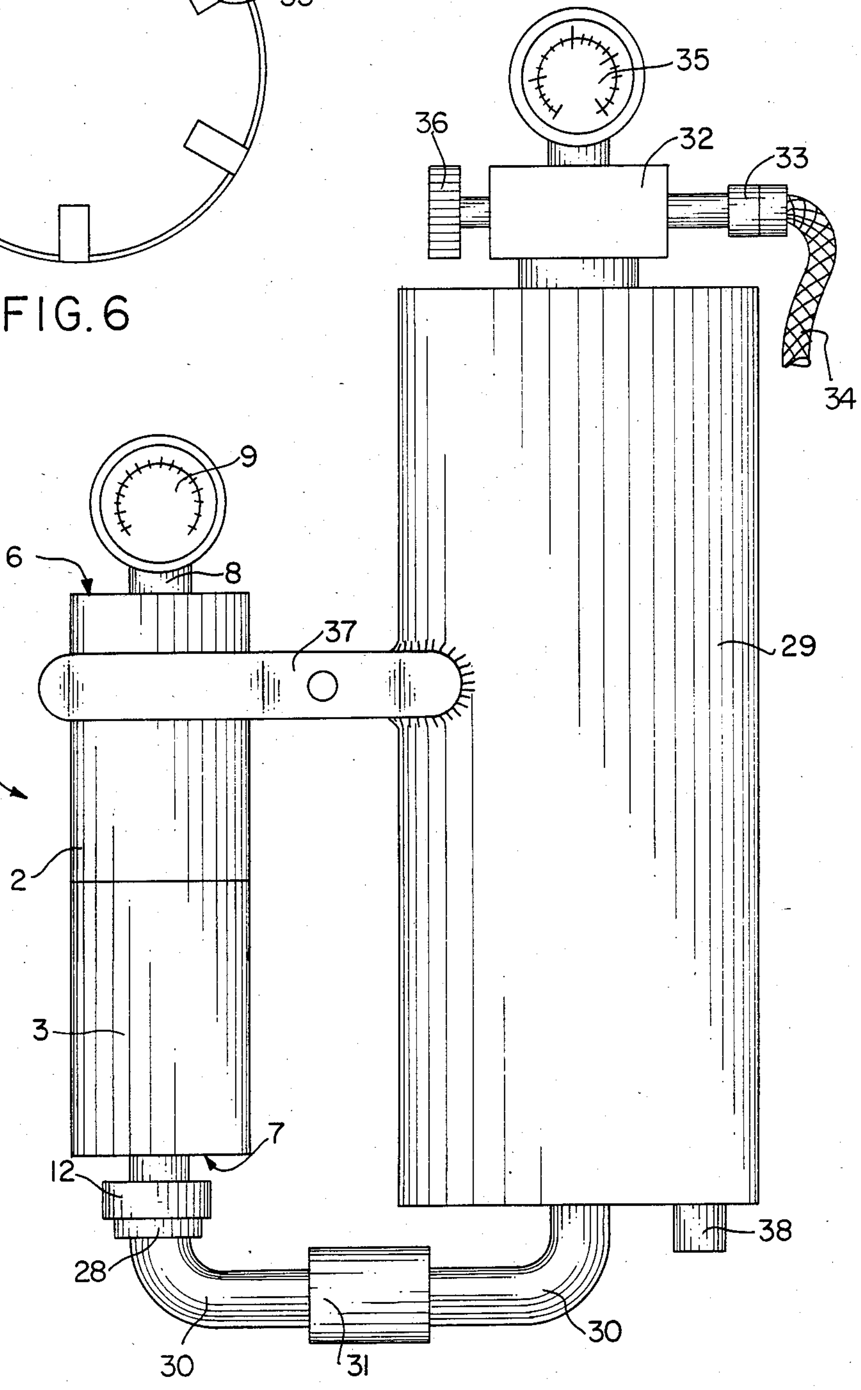

FIG. 1 is a partial axial cross section through an embodiment of a filling apparatus constructed in accordance with the invention, FIG. 2 is a partial axial cross section through the part of the pressure body that serves as a combustion case, FIG. 3 is a partial axial cross section through the part of the pressure body that serves as a filter case, FIG. 4 is a side elevational view of a heat guard for the embodiment shown in FIG. 2, FIG. 5 is a cross section on line VI—VI in FIG. 5, FIG. 6 is a top view of the spacer of FIG. 1, FIG. 7 is a side view of the filling apparatus of FIG. 1 joined (releasably) to a compressed-gas bottle.

FIG. 1 shows a pressure body 1 which comprises two shell-like, separable parts or portions 2 and 3, of which part 2 is referred to as the combustion case and part 3 as the filter case. Parts 2 and 3 are joined together by a threaded connection 4, which is made gas-tight by a gasket 5.

Parts 2 and 3 have end walls 6 and 7, respectively. Into the end wall 6 there is threaded the threaded nipple 8 of a pressure gauge 9. In the end wall 7 there is a compressed gas passage 11 which continues in a connecting piece 12 having an internal thread 14 which is complementary to the standardized connecting thread of a compressed-gas bottle which is not shown. A flat gasket 15 serves for sealing.

There is provided in the connector 12 a concentric valve tip 16 which is provided with a coaxial gas bore 17. The valve tip 16 cooperates with the nonreturn valve present in the compressed-gas bottle being filled, this valve being open for gas flow from pressure body 1 when the connector 12 is screwed on and closed gas flow from the compressed-gas bottle when the entire apparatus is removed, so that the oxygen present in the compressed-gas bottle cannot escape unless the receiving fitting belonging to the compressed-gas bottle is installed.

The two parts 2 and 3 of the cartridge holder comprising the tubular pressure body 1 envelop an inner chamber 19 which serves to accommodate the described combustible oxygen-yielding jacket-less cartridge 20 and surrounds the latter with a very close fit. According to an analysis of such commercial cartridges, the reactive mixture consists of the following components:

| | |
|---|---|
| Sodium chlorate | 84.5% |
| Metal chips | 12.2% |
| Metal oxides | 2.3% |
| Inert binders | 1.0% |
| | 100%. |

Cartridges of this kind are sold under the trademark "SOLIDOX", for example.

The cartridge 20 rests on a spacer 21 whose side averted from the cartridge 20 faces a filter chamber 22 with filter material 23. For example, a layer of granulated fire clay and rock wool can serve as filter material. The compressed-gas passage 11 leads in the manner shown in the drawing into the filter chamber 22, so that the released oxygen has to pass through the filter material. The spacer holds the cartridge 20 at a certain distance from the end wall 7 so that the entry of heat into the compressed-gas bottle is greatly reduced.

Part 3, i.e., the filter case, is provided with a plurality of cooling fins 24 by which the dissipation of heat to the atmosphere is markedly improved. Thus, a temperature gradient establishes itself whereby the temperature of the apparatus adjacent the connector 12 is markedly reduced. After the use of the apparatus, this construction permits a more rapid dissipation of heat to the surroundings, so that the apparatus is soon again ready for operation.

Part 2, i.e., the combustion case, is provided on its entire length with a heat guard 25*a* which consists of a thermal insulating material of high resistance to heat.

As it appears from the scale drawing, the apparatus of the invention is extraordinarily compact and therefore suitable for use as a typical home-handyman's appliance.

In FIG. 1, it can be seen that both parts 2 and 3 of the pressure body 1 are provided with cooling fins 24 over virtually their entire length. Parts 2 and 3 are each surrounded by a heat guard 25*a* and 25*b*, each of which consists of a plurality of rings 39 disposed coaxially side by side, which are joined together on their circumference by axis-parallel bridges 40 and 41, respectively. Between the rings 39 and the bridges 40–41, ventilation openings 42 are thus formed, which are defined by parallel walls of the rings 39 and form a kind of sector-shaped slots. It can be seen that the slots 43 between the cooling fins 24 communicate freely with the atmosphere.

It can additionally be seen in FIG. 1 that each heat guard 25*a* and 25*b* is provided with radially projecting lugs 44 which lend the heat guard the character of "wing nuts". One heat guard is of a configuration identical to that of the other heat guard and the pressure body has a dividing seam which lies in the middle of the pressure body. Each heat guard has radially projecting hand grips, namely the wing nuts. Each heat guard comprises a plurality of coaxial rings and axis-parallel diametrically opposite bridges joining together the rings on the surface thereof. The hand grips are disposed on the diametrically opposite bridges and each heat guard comprises two additional bridges disposed in diammetrical opposition between the bridges provided with the hand grips, and offset by 90°. The lugs 44 are disposed on the diametrically opposite bridges 40, while between these lugged bridges 40 the additional bridges 41 are disposed at 90° and diametrically opposite one another.

It is furthermore to be seen in FIG. 1 that the connector 12 is also provided with a pressure relief valve 45 of conventional type. Thus, in the improbable event that the gas bore in the valve tip 16 should in some way become clogged, the pressure relief valve 45 will respond in due time. It can also be seen that any gas issuing from the pressure relief valve first must flow through the filter chamber 22, so that the seat of the pressure relief valve 45 is protected against the lodging of particles in it.

FIGS. 2 and 3 illustrate the parts of which the pressure body 1 is composed. Parts 2 and 3 are made from hexagonal bar stock into which grooves 43 are turned at equal intervals, with cylindrical bottoms 43*a*, thereby forming the cooling fins 24. The part 2, serving as the combustion case, has an internal thread 4*a*, while the part 3, serving as the filter case, has a mating external thread 4*b*, which together form the threaded connection 4 (FIG. 1). Only in the area of the threaded connection 4 have the grooves 43*b* a lesser depth. The tap 6*a* present in the end wall 6 serves for the attachment of the pressure gauge 9. The tap 7*a* present in the end wall 7 serves for the attachment of the connector 12.

In their interior the parts 2 and 3 are provided with bores 46 and 47, which are blind holes except for the taps 6*a* and 7*a*, respectively, and which together form the inner chamber 19 of the pressure body 1. The part 3 serving as the filter case also has an annular shoulder 48 serving as an seat for the spacer 21 seen in FIG. 6. This annular shoulder 48 is adjoined by the filter chamber 22.

FIGS. 4 and 5 show the heat guard 25*a* and 25*b* in an elevational view and a cross-sectional end view taken along the diametrical line VI—VI, respectively. It can be seen especially in FIG. 5 that the axis-parallel bridges 40 and 41 are at 90° angles to one another and that the lugs 44 are formed integrally with the diametrically opposite bridges 40. In FIG. 5, the cross section of the outer envelope surface of the cooling fins 24 is indicated by a hexagon drawn in broken lines. It can be seen that the rings 39 and bridges 41 are shaped at the corners of this hexagon so as to complement the hexagonal shape of the cooling ribs and thus to form a mating junction circumferentially between the heat guard 25*a* and the corresponding part of the pressure body 1. However, the heat guard 25*a* can easily be fitted onto the pressure body 1 in the direction of the axis A—A. It can furthermore be seen that, except for their prismatic notches, namely their portions 39*a*, the rings have an arcuate shape so that, at a total of six points on their circumference, they are not in contact with the cooling fins 24. Thus, not only is thermal contact between the cooling fins and the heat guard additionally reduced, but also the ventilation of the prismatic outside surfaces of the cooling fins is additionally improved.

It is furthermore to be seen in FIGS. 4 and 5 that the ventilation openings 42 are defined by the bridges 40 and 41, on the one hand, and by the rings 39 on the other, i.e., they are sector-shaped slots defined by plane-parallel walls. The thickness of the rings 39, like the width of the ventilation openings 42, amounts to 5 mm each, in the direction of the axis A—A. In conjunction with the radial width of the rings 39, which is to be considered to be in scale, the result is a heat guard which, though the pressure body 1 underneath it is extremely well ventilated, effectively prevents contact with the hot metal parts of the pressure body even when the heat guard is held tightly in the hand. In FIG. 5, the cylindrical groove bottom 43*a* is indicated by a broken circle, and it can be seen that between this groove bottom and the bridges 40 and 41 a sufficient radial distance is present to permit ventilation of all sides of the pressure body even in the area of the groove bottom. The heat guard 25*a* has adjacent to the lugs 44 an end wall 49 with a bore 50 which serves to accommodate the threaded nipple 8 of the pressure gauge 9 or of the connector 12. After these parts are installed, the heat guard 25a or 25b is held against shifting on the corresponding part of the pressure body 1.

It can be seen especially from FIG. 5 that the heat guard can easily be stripped from an injection-molding die of complementary shape if the parting seam of the die lies in a plane of symmetry passing through the lugs 44. The die can then consist of only two halves with no movable inserts and of one die core.

FIG. 6 is a plan view of the spacer 21, which is in the form of a circular disk and is provided with radial marginal notches 55 extending further inward radially than the annular shoulder 48 in FIG. 3 on which the spacer 21 is laid. This permits the unhampered entrance of the oxygen into the filter chamber 42.

In FIG. 7 parts identical to those of FIG. 1 are provided with the same reference numbers. The pressure body 1 is joined by the connector 12 to a connecting thread 28 belonging to a compressed-gas bottle 29. The connecting thread 28 is connected to the compressed-gas bottle by a pipeline 30 containing a nonreturn valve 31. This compressed-gas bottle is provided with a pressure reducing valve 32 followed by a connector 33 to which a gas hose 34 is connected, which leads to a gas-consuming device (burner). The pressure at the outlet of the pressure reducing valve, which is adjustable by means of a hand wheel 36, is indicated by a pressure gauge 35. The pressure body 1 is releasably connected to the compressed-gas bottle 29 by a holder 37. By means of a safety valve 38, which can be opened by hand to remove any condensate water, the apparatus is protected against excessive gas pressures.

The apparatus operates in the following manner: After unscrewing the combustion case 2 the pressure body 1 is charged with an ignited cartridge 20 (FIG. 1) and reclosed.

By a low setting of the pressure reducing valve 32, initially a portion of the oxygen flowing through the pipe 30 is let out and thus the nitrogen is largely removed (purging). Then the gas outlet is shut off so that the pressure in the compressed-gas bottle 29 gradually rises (pressure gauge 9). A steady pressure reading on the gauge 9 indicates that the cartridge is completely burnt. The pressure body 1 can now be charged in the same manner with another burning cartridge, while the nonreturn valve 31, opening in the direction of the compressed-gas bottle, prevents any back flow of oxygen which is under elevated pressure in the compressed-gas bottle. As soon as the pressure in the pressure body 1 exceeds the pressure equilibrium, which occurs very rapidly, the nonreturn valve 31 opens and additional oxygen flow into the compressed-gas bottle. It is of course possible to withdraw oxygen in portions or continuously during the filling process.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus comprising:

(a) a cartridge holder for a combustible jacket-less cartridge yielding oxygen in the burning state, (b) a compressed-oxygen bottle with connection means for connecting said bottle to said cartridge holder thereby refilling said bottle, (c) said cartridge holder accommodating the cartridge, from whose interior the oxygen can be transferred to the compressed-oxygen bottle, said cartridge holder surrounding the cartridge closely, (d) said cartridge holder comprising a tubular pressure body, said cartridge holder having a counterthread portion for the external screwing of the pressure body onto the compressed-oxygen bottle connection means and a compressed-oxygen passage for the transfer of the oxygen to the compressed-oxygen bottle, (e) said cartridge holder including a heat guard on at least a portion of the length of said pressure body, (f) said pressure body comprising cooling ribs on at least a portion of its length and having grooves therebetween, and (g) said heat guard comprising a hollow body provided with ventilation openings and which is slipped onto said cooling ribs such that said ventilation openings communicate with said grooves between said cooling ribs, said heat guard comprising a plurality of coaxial rings and axis-parallel bridges joining said rings on the circumference thereof, said rings and said bridges surrounding said ventilation openings between said bridges and said rings.

2. Apparatus in accordance with claim 1, in which said rings align radially with said cooling ribs.

3. Apparatus in accordance with claim 2 which comprises grooves lying between said cooling ribs and each groove having a groove innermost surface in which the innermost surface of said grooves between the cooling ribs has a spacing from said bridges.

4. Apparatus in accordance with claim 1, in which said pressure body comprises two shell-like portions and in which both of said portions of said pressure body include cooling ribs, the apparatus comprising a heat guard for each of said portions.

5. Apparatus in accordance with claim 4, in which said heat guard for each of said portions comprises a plurality of coaxial rings and axis-parallel diametrically opposite bridges joining together said rings on the surface thereof and in which said hand grips are disposed on said diametrically opposite bridges and in which said heat guard comprises two additional bridges disposed in diametrical opposition between the bridges provided with said hand grips, and offset by 90°.

6. Apparatus in accordance with claim 1, in which said pressure body comprises two shell-like protions which are releasable from one another, said portions of said pressure body have outside surfaces and the outside surfaces of said portions of said pressure body form a polygon in cross section in the area of said cooling ribs and which comprises grooves lying between said cooling ribs and each groove having a groove innermost surface that is circular in cross section.

7. Apparatus in accordance with claim 1, in which said cooling ribs form a polygonal surface having corners and in which said rings and said bridges are in contact with said cooling ribs only at the corners of said polygonal surface of said cooling ribs, but have between said corners a spacing from said cooling ribs.

* * * * *